July 22, 1969
H. A. KEMBLE ET AL
3,456,686
TWO-COMPARTMENT RESERVOIR
Filed Dec. 1, 1967
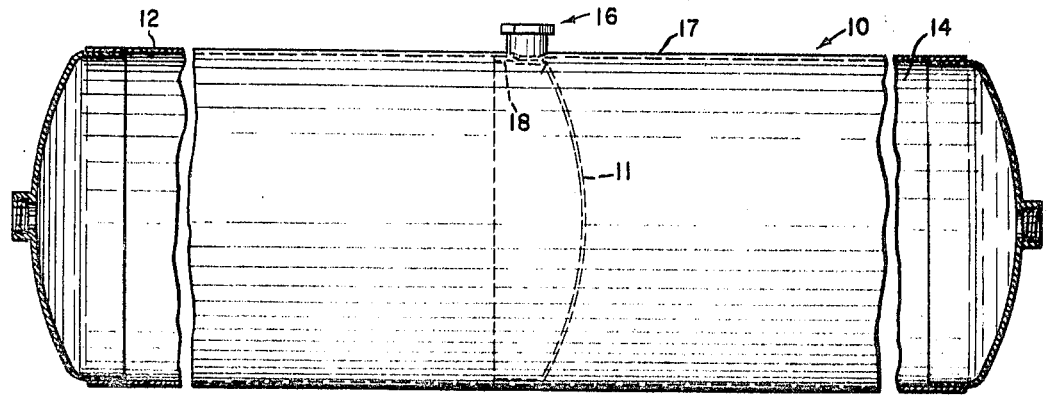
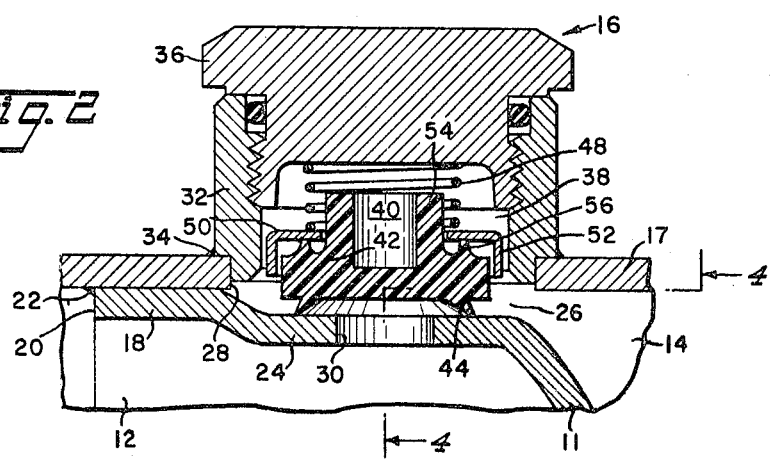
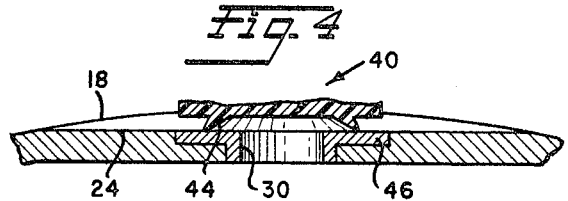
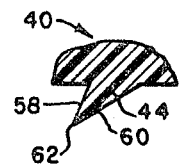
INVENTORS
HERBERT A. KEMBLE
CAMDEN A. RIGG
BY
*Scrivener Parker Scrivener & Clarke*
ATTORNEYS

3,456,686
TWO-COMPARTMENT RESERVOIR

Herbert A. Kemble and Camden A. Rigg, Elyria, Ohio, assignors to Bendix-Westinghouse Automotive Air Brake Company, Elyria, Ohio, a corporation of Delaware
Filed Dec. 1, 1967, Ser. No. 687,211
Int. Cl. F17c 1/00; F16k 15/14
U.S. Cl. 137—576                                    4 Claims

ABSTRACT OF THE DISCLOSURE

A compressed air reservoir provided with a central partition dividing the reservoir into two compartments, the partition provided with a flange having an opening therein adjacent the wall of the reservoir and a spring-closed check valve normally closing the opening and permitting air flow in one direction from one compartment to the other but preventing air flow in the reverse direction, the check valve including a housing mounted on the exterior of the reservoir and also including a valve element adapted to seat directly on the partition flange.

---

This invention relates to compressed air reservoirs for vehicle air brake systems and more particularly to a two-compartment reservoir provided with a check valve for controlling the air flow from one compartment to the other.

Compressed air braking systems have heretofore been provided with a pair of serially connected reservoirs for storing air from the compressor, the first reservoir for receiving air directly from the compressor being termed the wet reservoir since it collects the major portion of the moisture from the compressed air, and second reservoir being termed the dry reservoir, the latter serving as the source of dry air for the braking system. The two reservoirs are interconnected by conduits having a check valve therein for allowing air flow in one direction only from the wet reservoir to the dry reservoir.

In the interests of economy, a single reservoir has been proposed having a partition therein dividing the reservoir into wet and dry compartments and a variety of check valve constructions have been provided for controlling the air flow from the wet to the dry compartments. Many of the prior constructions suffer the disadvantage of inaccessibility of the valve parts for inspection and repair and the cooperating valve parts were subject to leakage so that long periods of trouble-free use could not be expected It is accordingly an object of the present invention to provide a two compartment reservoir having a check valve cooperating directly with the partition flange which is so constructed as to avoid the foregoing disadvantages.

Another object is to provide a novel construction of the above type wherein the check valve body is mounted directly on the exterior wall of the reservoir adjacent the partition flange so that the check valve may be readily available for inspection and repair.

A further object is to provide a novel check valve element which is housed within the body and which is arranged to cooperate directly with the partition flange in order to secure an efficient seal to prevent reverse flow of air from the dry to the wet compartment in the event of leakage of air from the latter due to a break in the conduit between the wet compartment and the compressor.

Still another object is to provide a novel seat construction for the valve element in order to secure an efficient seal thereof with the partition flange.

Other objects and novel features of the invention will appear more fully hereinafter from a consideration of the following detailed description when taken in connection with the accompanying drawing. It will be expressly understood however, that the drawing is utilized for purposes of illustration only and is not to be taken as a definition of the limits of the invention, reference being had for this purpose to the appended claims.

Referring to the drawing wherein similar reference characters refer to similar parts throughout the several views:

FIG. 1 is a plan view partly in section of a two compartment reservoir embodying the principles of the present invention;

FIG. 2 is a longitudinal sectional view of the check valve and illustrates its cooperation with the partition flange for controlling the air flow between the compartments;

FIG. 3 is an enlarged view of a portion of the valve element of FIG. 2, and

FIG. 4 is a partial sectional view taken substantially along lines 4—4 of FIG. 2 and illustrates the use of a valve seat insert in the partition flange.

Referring more particularly to FIGS. 1 and 2, a two-compartment reservoir embodying the principles of the present invention is illustrated therein as comprising a reservoir 10 having a centrally disposed air tight partition 11 therein dividing the reservoir into wet and dry compartments 12 and 14, respectively, a check valve device 16 being mounted on the wall 17 of the reservoir in order to control the air flow between the compartments.

As shown more particularly in FIG. 2, the partition 11 is dish-shaped to provide a flange 18 having its peripheral edge 20 welded at 22 to the interior of the reservoir 10, and as illustrated, the flange 18 adjacent the top of the reservoir is formed to provide a flattened or indented flange portion 24 which is spaced slightly below the reservoir wall to provide a passage 26. Axially aligned openings 28 and 30 are provided in the reservoir wall 17 and flange portion 24, respectively, and the body of the check valve 16 includes a collar or ferrule 32, welded at 34 to the reservoir wall 17, and a cap nut 36 threadly received within the ferrule 32. With the parts 32 and 36 assembled as just described, a valve chamber 38 is formed above the flange portion 24 and such chamber is in constant communication with the dry compartment 14 by way of the passage 26.

For the purpose of controlling the air flow between compartments 12 and 14 via valve chamber 38 and passage 26, a novel valve element 40 is provided, such element being preferably formed of a suitable plastic or rubbery material and provided with a body part 42 and a downwardly projecting annular bead 44 forming a deformable seating part for direct sealing engagement with the upper surface of the flange portion 24 surrounding the opening 30. If desired, a separate non-corrosive metal insert 46 may be welded in position in the flange portion 24, as shown in FIG. 4, in order to provide a wear seat for the annular bead 44.

In order to resiliently maintain the valve element 40 in seated position to close communication between the compartments 12 and 14, a spring 48 is interposeed between the nut 36 and a valve guide 50, the latter having a flange 52 normally spaced from the body part 42 and also having a central opening of larger diameter than that of a projection 54 formed on the body part. Thus the valve guide 50 is normally spaced from the parts 42 and 54 as described. The valve guide 50, however, is in constant contact with an upstanding annular shoulder 56 formed on the body part 42 and preferably, such shoulder is axially aligned with the annular bead 44 in order to secure a uniform seating force on the latter due to the action of the spring 48. As shown in FIG. 3, the bead 44 is provided with side surfaces 58 and 60 which are arranged at an acute angle to form an annular lip 62 which is angled outwardly with respect to the vertical axis of the valve element. In this manner, the lip 62 and bead 44 constitute a deformable valve member which effectively seals communication between the compartments 12 and 14 when the pressure in the latter is higher than that in the former.

In operation, as the pressure in wet compartment 12 is built up, the valve 40 is moved off its seat in order to establish communication between the compartments 12 and 14 by way of the openings 30, valve chamber 38 and passage 26. When the pressures in the two compartments are substantially equalized, the valve 40 seats and effectively prevents any air flow in the opposite direction in the event that for any reason, the pressure in the wet compartment 12 should fall below that in the dry compartment 14.

The present invention thus provides an efficient construction for controlling the air flow in a two-compartment reservoir. The arrangement is such that the valve element is protected by the body parts 32 and 36 while the use of the removable nut 36 enables ready access to the valve element and spring for ready inspection and repair. The particular construction of the annular bead 44 and the lip 62 constitutes a valve portion which enables efficient sealing engagement with its seat accompanied by a wiping action due to the deformation of the bead. A further important feature resides in the alignment of the bead 44 and the shoulder 56 whereby a uniform valve seating force is obtained under the action of the spring 48.

What is claimed is:

1. A two-compartment reservoir comprising a tank having a partition therein, said partition provided with an annular flange having its peripheral edge welded to the tank to divide the latter into separate wet and dry compartments and said flange provided with a flattened portion generally parallel with the wall of the tank and spaced a slight distance inwardly thereof, the wall of the tank and said flattened portion being provided with aligned openings, a valve for controlling air flow from the wet compartment to the dry compartment comprising a ferrule welded to the outer tank wall about the opening in the latter, a nut threadly received in said ferrule, said nut and ferrule forming a valve chamber communicating at all times with said dry compartment, an integral valve element formed of plastic material positioned within said chamber and having an upstanding projection, a body part of greater diameter than said projection and an annular valve face bead for seating directly upon said flattened portion to normally close communication between the wet compartment and the valve chamber, said body part having an upstanding annular shoulder axially aligned with said bead, a flanged valve guide surrounding the valve element and contacting said annular shoulder and a spring iterposed between said nut and said valve guide.

2. A two-compartment reservoir as set forth in claim 1 wherein the valve guide is formed with a disk portion normally spaced from said upstanding projection and a flange portion normally spaced from said body part and said disk portion engages said annular shoulder.

3. A two-compartment reservoir as set forth in claim 1 wherein said valve face bead is formed by a pair of faces arranged to an acute angle to form an outwardly directed deformable seat-engaging lip.

4. A two-compartment reservoir as set forth in claim 2 wherein said valve face bead is formed by a pair of faces arranged to an acute angle to form an outwardly directed deformable seat-engaging lip.

References Cited

UNITED STATES PATENTS 3,223,118   12/1965   Hutelmyer _____ 137—576

M. CARY NELSON, Primary Examiner

JOHN R. DWELLE, Assistant Examiner

U.S. Cl. X.R.

137—540